United States Patent [19]
Kinoshita et al.

[11] Patent Number: 5,369,537
[45] Date of Patent: Nov. 29, 1994

[54] DISK DRIVING DEVICE WITH IMPROVED DISK MOUNTING SURFACE

[75] Inventors: Shinji Kinoshita; Yoshitaka Murayama, both of Komagane, Japan

[73] Assignee: Sankyo Seiki Mfg. Co., Ltd., Nagano, Japan

[21] Appl. No.: 1,276

[22] Filed: Jan. 7, 1993

[30] Foreign Application Priority Data

Jan. 9, 1992 [JP] Japan ............................. 4-004062[U]

[51] Int. Cl.$^5$ ............................................ G11B 17/028
[52] U.S. Cl. ................................ 360/99.12; 360/98.08
[58] Field of Search ............... 360/98.08, 99.05, 99.12, 360/98.07, 99.04, 99.08; 369/270, 271

[56] References Cited

U.S. PATENT DOCUMENTS

| | | | |
|---|---|---|---|
| 4,065,799 | 12/1977 | Kaczeus | 260/99.05 |
| 4,403,319 | 9/1983 | Adamek et al. | 360/99.05 |
| 4,754,447 | 6/1988 | VanSant | 360/98.08 |
| 5,089,922 | 2/1992 | LeClair | 360/99.12 |

*Primary Examiner*—Robert S. Tupper
*Attorney, Agent, or Firm*—McAulay Fisher Nissen Goldberg & Kiel

[57] ABSTRACT

A disk driving device comprises a hub on which a data recording disk is mounted. The hub is rotated together with the disk. The hub has a disk mounting surface on which the disk is mounted. The disk mounting surface is inclined radially outwardly of the axis of rotation of the hub towards the side of the hub where the disk is mounted.

8 Claims, 7 Drawing Sheets

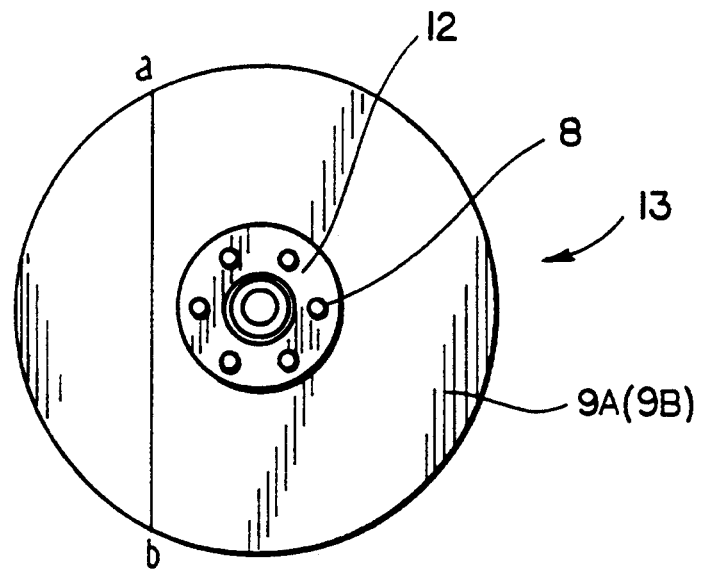
F I G. 5
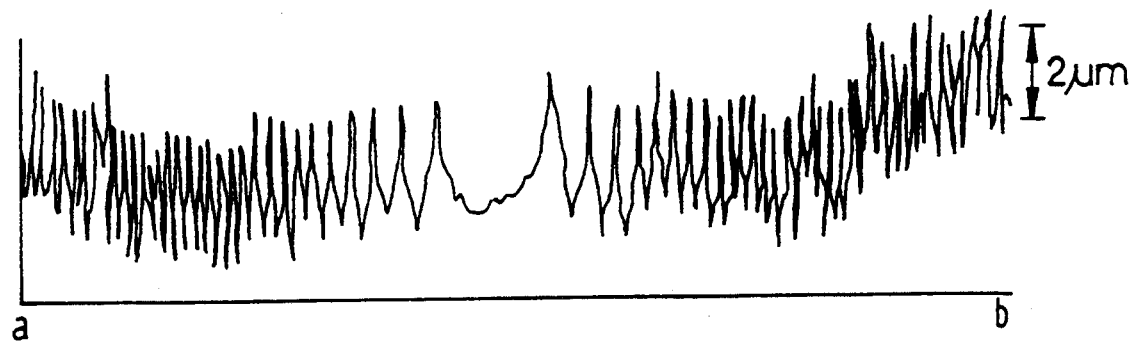
F I G. 6

F I G. 7
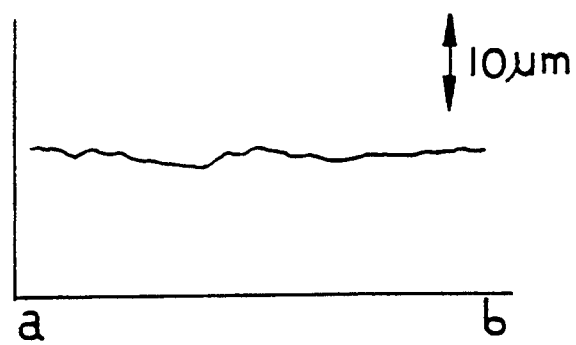
F I G. 8
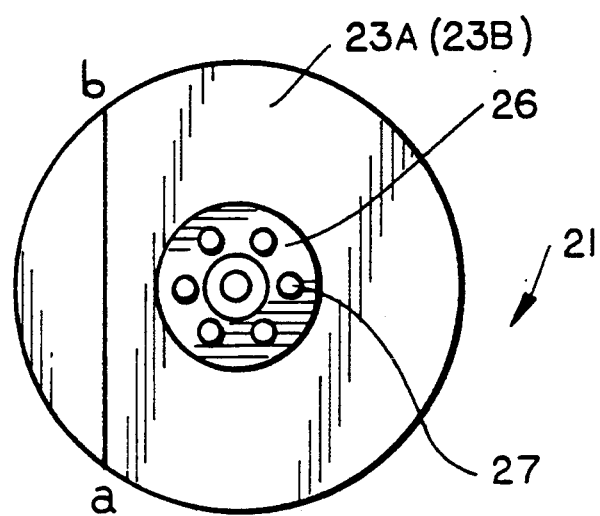
F I G. 9

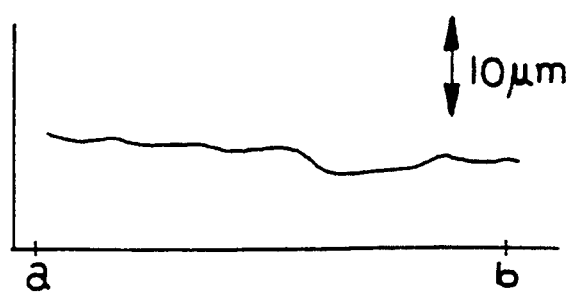
F I G. 14
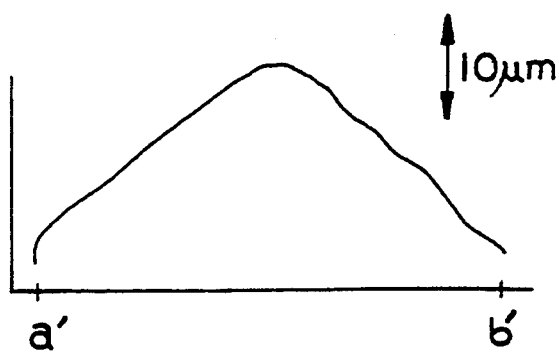
F I G. 15

DISK DRIVING DEVICE WITH IMPROVED DISK MOUNTING SURFACE

BACKGROUND OF THE INVENTION

1. Field of the Invention

This invention relates to a disk driving device for rotating a disk such as a magnetic disk on which data are recorded, and, more particularly, to a configuration of a disk mounting surface thereof on which such a disk is mounted.

2. Description of the Related Art

An example of a conventional disk driving device adapted to rotate a magnetic disk or the like is as shown in FIGS. 9 through 12. The disk driving device, as shown in FIGS. 9 through 12, includes a cylindrical spindle hub 30, on which disks 23A and 23B are mounted.

The spindle hub 30 is integral with the rotor of a disk driving motor. The disk driving motor has a drive magnet 32, which is mounted on the inner surface of the cylindrical wall of the spindle hub 30.

As described above, the spindle hub 30 is cylindrical. More specifically, the configuration of the spindle hub 30 is such that a plurality of cylinders are stacked which are different in diameter. The spindle hub 30 has a disk mounting portion 24 in the form of a flange where the spindle hub is changed in diameter. The disk mounting portion 24, as shown in FIG. 10, has a disk mounting surface 25.

Two disks 23A and 23B are mounted on the disk mounting surface 31 with a spacer 31 therebetween. That is, the disk 23B, the space 31, and the disk 23A are mounted on the disk mounting surface 31 in the stated order. A retaining member 26 is placed on the upper surface of the disk 23A. More specifically, the retaining member 26 has holes which are in alignment with a plurality of threaded holes 28 formed in the spindle hub 30, respectively. A plurality of screws 27 are screwed through the holes of the retaining member 26 into the threaded holes 28 of the spindle hub 30, thus fixedly securing the retaining member 26 to the spindle hub 30. As a result, the two disks 23A and 23B are fixedly secured onto the disk mounting surface 25 of the spindle hub 30. In this operation, it should be noted that the screws 27 are all tightened with a predetermined tightening torque.

In the disk driving device designed as described above, in order to improve the straightness of the disk mounting surface 25 with respect to the axis of rotation of the spindle hub 30, the disk mounting surface 25 is machined. After being machined, the straightness of the disk mounting surface 25 is measured with respect to each point on a linear portion of the disk mounting surface 25 which is extended from the point a to the point b (FIG. 11) (hereinafter referred to as "a linear portion a-b", when applicable). The results of the measurement are as indicated in a graphical representation of FIG. 13. Connecting the peaks of the polygonal lines in the graphical representation forms a line which represents the straightness of the linear portion a-b. It can be determined from the graphical representation of FIG. 13 that the disk mounting surface 25 is substantially perpendicular to the axis of rotation of the spindle hub 30; in other words, the disk mounting surface 25 is substantially horizontal.

In the above-described conventional disk driving device, straightness is employed for indication of the accuracy of the disk mounting surface. However, it goes without saying that other scales may be employed for this purpose; for instance, parallelism may be employed which indicates to what degree the disk mounting surface is parallel with respect to a reference surface which is used for installation of the motor.

Problems To Be Solved By The Invention

In manufacturing the disk driving device 21, in practice, the disks 23A and 23B are mounted on the disk mounting surface 25 which has been improved in straightness as described above. In this operation, the disk mounting portion 24 having the disk mounting surface 25 is bent by the force of screwing the screws 27 into the threaded holes of the spindle hub, and accordingly the disk 23B is also bent, which adversely affects the straightness.

In general, in a disk driving device, a predetermined gap of the order of microns is provided between a mounted disk and a head for reading data from the disk. Hence, if the disk 23B has a low degree of straightness as was described above when mounted, then the gap between the disk 23B and the head deviates from the predetermined value. This results in the head being unable to satisfactorily read data therefrom. That is, the resultant disk driving device is no longer useful.

FIGS. 14 and 15 are graphical representations indicating the result of measurement given to the same parts (the linear portions a-b) of the upper disk 23A and the lower disk 23B for detection of the straightness thereof. As is apparent from those figures, the lower disk 23B on the spindle hub 30 is unsatisfactory in straightness.

This is due to the following: The screws 27 inserted into the retaining member 26 are tightened so that the two disks 23A and 23B are fixedly secured onto the disk mounting surface of the spindle hub 30. In this operation, the screw tightening force is applied substantially perpendicular to the surfaces of the disks 23A and 23B (from above in FIG. 10). The screw tightening force is received by the spacer 31 (hereinafter referred to as "a disk mounting portion 31", when applicable) having a disk mounting surface 32, and by the disk mounting portion 24 having the disk mounting surface 25. In other words, those disk mounting portions 31 and 24 act against the screw tightening force, thus applying a reaction force to the retaining member 26. With the tightening force and the reaction force in balance, the two disks 23A and 23B are fixedly mounted.

That is, the reaction force of the disk mounting portion (or the spacer) 31, on which the upper disk 23A is mounted, is great enough to receive the tightening force. Therefore, even when the disk 23A is mounted on it, the straightness of the disk mounting surface 32 is maintained unchanged, and accordingly the disk 23A is not bent. This effect may be, in another aspect, due to the fact that the disk mounting portion 31 is made of a hard material which is scarcely bent.

On the other hand, the reaction force of the disk mounting portion 24 of the spindle hub 30 is not high enough to withstand the tightening force, so that the lower disk 23B is bent.

In other words, the disk mounting portion 24 of the spindle hub 30 should support the weight of the disk 23A and the weight of the spacer 31 in addition to the screw tightening force which is used for fixing the retaining member with the screws 27. However, the disk mounting portion 24 is not mechanically strong enough to support those loads, and therefore the lower disk 23B is bent.

As is seen from the above description, the disk mounting portion 24 of the spindle disk 30 should be so modified that its reaction force is great enough against the tightening force. (This may be achieved by increasing the wall thickness thereof.) However, it is rather difficult to decrease the thickness of the disk mounting portion, because in order to miniaturize the disk driving device or to reduce the thickness of the latter, the rotor of the disk driving motor is made integral with the spindle hub 30 as shown in FIG. 10.

The thickness of the disk mounting portion may be reduced by forming the spindle hub 30 with a hard material which is scarcely bent. However, the method involves another problem. That is, since the spindle hub is rather intricate in configuration, and it must be finished with high accuracy, in manufacture of the spindle hub by using the hard material it is necessary to use expensive machining tools, and machining such a spindle hub with high accuracy takes a relatively long period of time.

OBJECTS AND SUMMARY OF THE INVENTION

Accordingly, a primary object of this invention is to eliminate the above-described difficulties accompanying a conventional disk driving device. More specifically, an object of the invention is to provide a disk driving device in which a disk mounted therein is improved in straightness.

In accordance with the invention, a disk driving device comprises a hub on which a data recording disk is mounted, the hub being rotated together with the disk. The hub has a disk mounting surface on which the disk is mounted. The disk mounting surface is inclined radially outward of the axis of rotation of the hub towards the side of the hub where the desk is mounted.

For a better understanding of the present invention, reference is made to the following description and accompanying drawings while the scope of the invention will be pointed out in the appended claims.

BRIEF DESCRIPTION OF THE DRAWINGS

FIG. 5 is a plan view of the disk driving device according to the invention;

FIG. 6 is a graphical representation indicating the straightness of a disk mounting surface formed on the spindle hub which is applied to the disk driving device shown in FIG. 4;

FIG. 7 is a graphical representation indicating the straightness of a disk applied to the disk driving device;

FIG. 8 is also a graphical representation indicating the straightness of another disk applied to the disk driving device;

FIG. 9 is a plan view showing an example of a conventional disk driving device;

FIG. 14 is a graphical representation indicating the straightness of a disk applied to the conventional disk driving device;

FIG. 15 is also a graphical representation indicating the straightness of another disk applied to the conventional disk driving device.

DESCRIPTION OF THE PREFERRED EMBODIMENTS

An example of a disk driving device according to this invention will be described with reference to the accompanying drawings.

Figure 1:
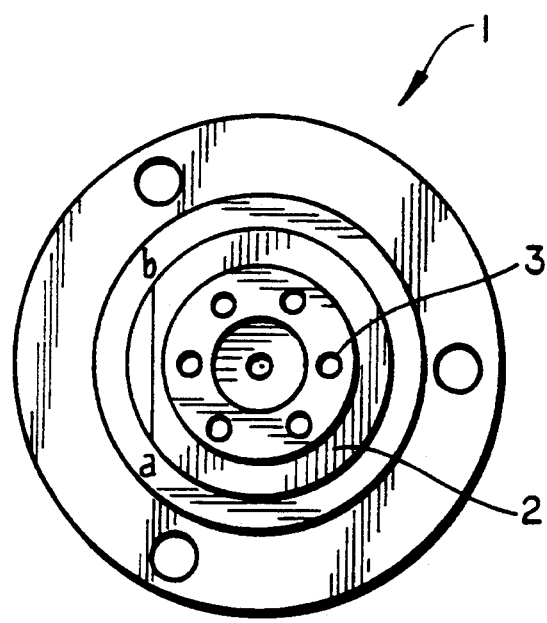
FIG. 1 is a plan view showing an example of a spindle hub employed in a disk driving device according to the invention.
Figure 2:
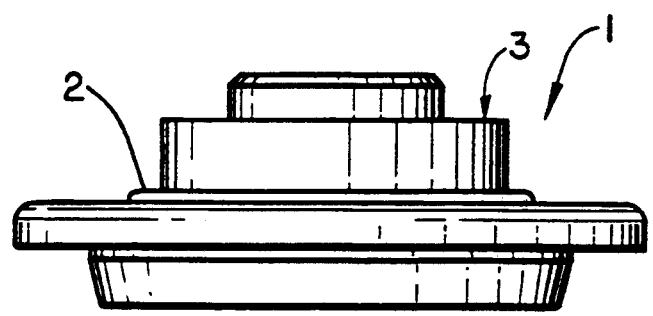
FIG. 2 is a side view of the spindle hub shown in FIG. 1.
Figure 3:
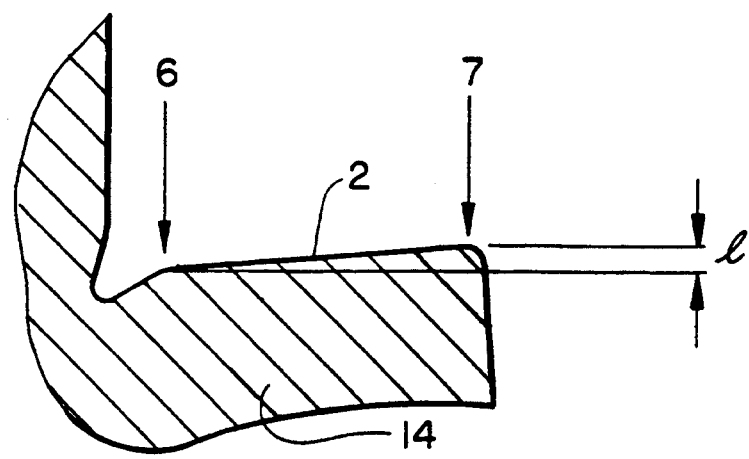
FIG. 3 is an enlarged sectional view showing essential parts of the spindle hub.
Figure 4:
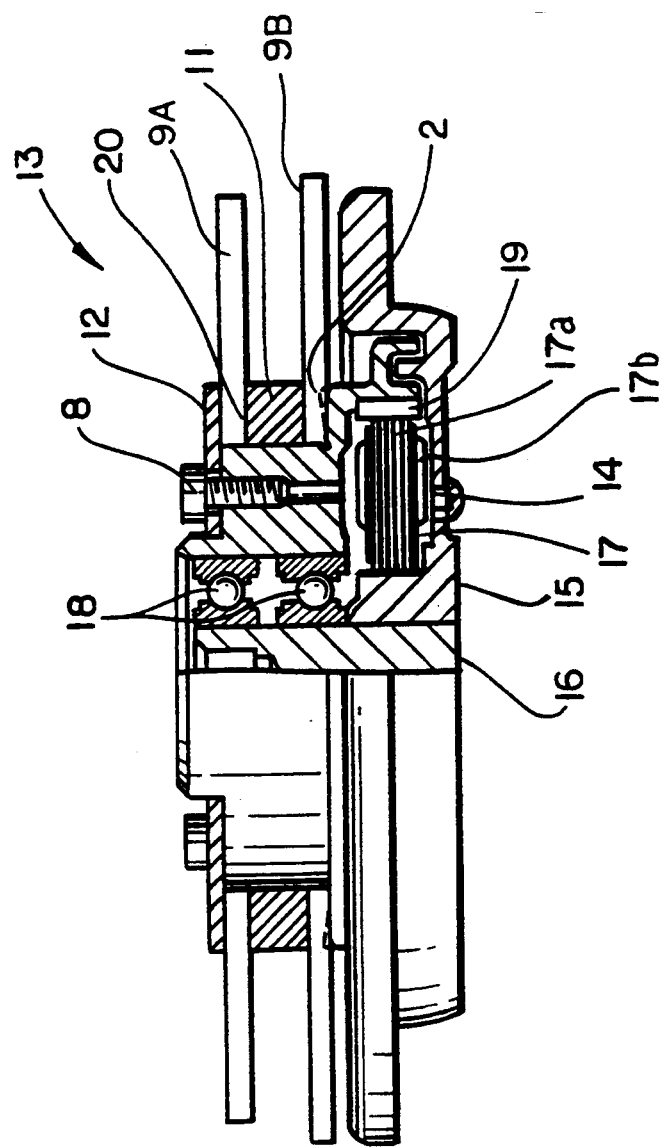
FIG. 4 is a section view showing one example of the disk driving device according to the invention.
Figure 10:
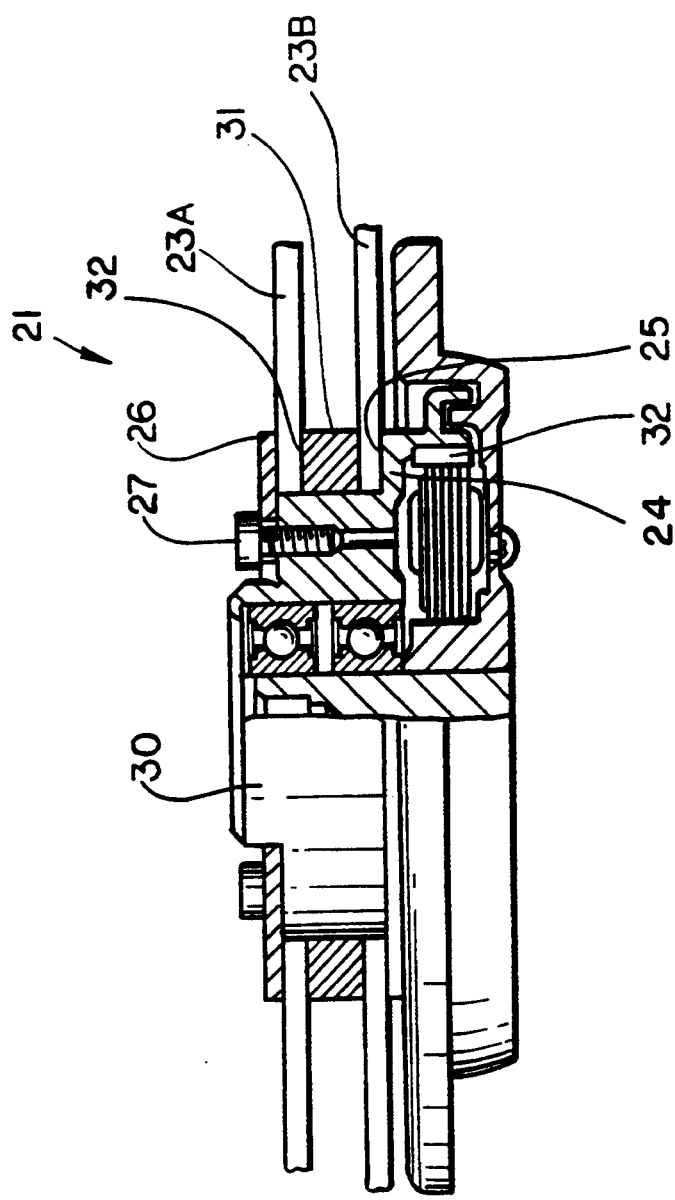
FIG. 10 is a sectional view of the conventional disk drive device.
Figure 11:
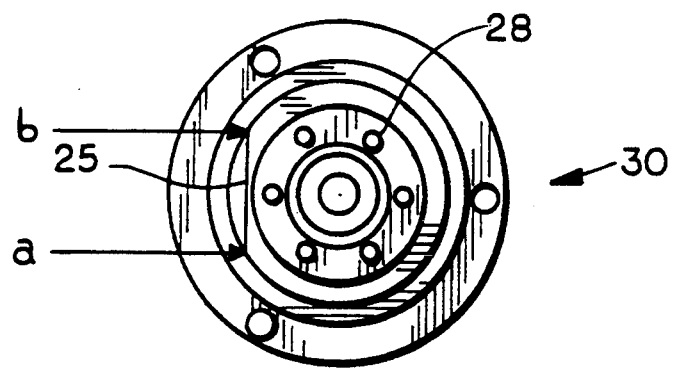
FIG. 11 is a plan view of a spindle hub applied to the conventional disk driving device.
Figure 12:
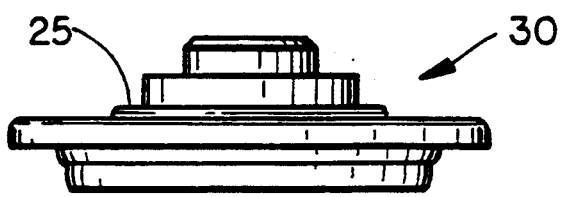
FIG. 12 is a side view of the spindle hub shown in FIG. 11.
Figure 13:
FIG. 13 is a graphical representation indicating the straightness of a disk mounting surface of the spindle hub shown in FIGS. 11 and 12.

As shown in FIGS. 1 through 5, the disk driving device 13 according to the invention has a spindle hub 1 on which disks 9A and 9B are mounted. The spindle hub 1 accommodates a rotor section of the disk driving device 13 in such a manner that the rotor is integral with the spindle hub. The configuration of the spindle hub 1 is such that a plurality of cylinders are stacked which are different in diameter. The spindle hub 1 has a disk mounting portion 14 in the form of a flange where the spindle hub is changed in diameter. The disk mounting portion 14 has a disk mounting surface 2. Two disks 9A and 9B are mounted on the disk mounting surface 2 with a spacer 11 therebetween, as shown in FIG. 4.

The spacer 11 is cylindrical, and its size (diameter) is substantially equal to that of the disk mounting surface 2 of the disk mounting portion 14.

The spacer 11 also has a disk mounting surface 20 on which a disk is mounted. A retaining member 12 is placed on the disk 9A which is mounted on the disk mounting surface 20 of the spacer 11. The retaining member 12 has holes which are in alignment with a plurality of threaded holes 3 formed in the spindle hub 1, respectively. The retaining member 12 is in the form of a disk, the size (diameter) of which is substantially equal to that of the disk mounting surface 2 of the disk mounting portion 14. A plurality of screws 8 are screwed through the holes of the retaining member 12 into the threaded holes 3 of the spindle hub 1, thus fixedly securing the retaining member 26 to the spindle hub 30. As a result, the two disks 9A and 9B are fixedly secured onto the disk mounting surface 2 of the spindle hub 1 while being pushed thereon. In this operation, it should be noted the screws 8 are all tightened with a predetermined tightening torque.

The disk driving device 13, as shown in FIG. 4, has a frame 15, on which a shaft 16 is fixedly mounted, and the spindle hub 1 is rotatably mounted on the shaft 16 through (a pair of) bearings 18. A drive magnet 19 forming the rotor of a drive motor for the disk driving device 13 is mounted on the inner surface of the cylindrical wall of the spindle hub 1. The stator 17 of the drive motor is arranged on the frame 15 of the disk driving device 13. The stator 17 is made up of a laminated stator core 17a with a plurality of radially protruded poles, on which a drive coil 17b is wounded. The stator core 17a is set opposed to the drive magnet 19 with a gap therebetween.

A circuit (not shown) for operating the drive motor is provided on the frame 15. The circuit controls the application of current to the drive coil 17b, so as to rotate the spindle hub 1 which is integral with the rotor, so that the two disks 9A and 9B mounted on the spindle hub 1 are rotated. The above-described arrangement of the drive motor itself is well known in the art, and the invention is not limited thereto or thereby.

In the disk driving device thus constructed, the disk mounting surface 2 of the spindle hub 1, on which the disk 9B is mounted, is inclined radially outwardly of the axis of rotation of the spindle hub 1 towards the disk 9B.

This will be described in more detail. As shown in FIG. 3, in the disk mounting surface 2, the innermost periphery 6 is lowest in level, and the disk mounting surface 2 slopes gradually from the innermost periphery 6 upwards towards the outermost periphery 7. This is a specific feature of the disk mounting surface 2. Thus, there is a difference between the level (in the direction of the axis of the spindle hub 1) of the innermost periphery 6 and that of the outermost periphery 7.

In the embodiment, the difference is 2 to 3.5 μm; however, it should be determined through experiments.

The results of measurements given to the linear portion a-b of the disk mounting surface 2 are as indicated in FIG. 6, a graphical representation. In FIG. 6, connecting the peaks of the polygonal lines provides a line which represents the straightness of the disk mounting surface. As is apparent from the graphical representation of the linear portion a-b, the part closest to the axis of rotation of the spindle hub 1 (corresponding to the middle of the linear portion a-b) is different in height from the remaining parts (corresponding to the points a and b, and their vicinities).

The straightness of each of the two disks 9A and 9B was measured which were mounted on the disk mounting surface 1 of the spindle hub 1 with the spacer 111 therebetween The results of measurement are as shown in FIGS. 7 and 8. The measurement was given to the same parts (the linear portions a-b) of the disks 9A and 9B for detection of the straightness thereof. As is apparent from those figures, the two disks 9A and 9B mounted on the disk mounting surface are improved in straightness when compared with the conventional ones.

This is due to the following: When the disks 9A and 9B mounted on the disk mounting surface 2 of the spindle hub 1 with the spacer 11 therebetween are pushed against the disk mounting surface 1 by tightening the screws 8, the outer peripheral portion of the disk mounting surface 2 is bent, thus becoming equal in level to the inner peripheral portion. This improves the straightness of the disk mounting surface 2. As the two disks 9A and 9B are improved in straightness, the parallelism of the disk with respect to the head which is to be moved in parallel with the surface of the latter is improved, which eliminates the difficulty where the head cannot satisfactorily read data from the disk because it is not in parallel with the latter.

While the invention has been described with reference to the disk driving device in which the rotor of the drive motor is integral with the spindle hub, and two disks are mounted on the latter, it should be noted that the invention is not limited thereto or thereby. That is, the technical concept of the invention can be applied to the cases where the rotor of the drive motor is not integral with the spindle hub, only one disk is mounted on the spindle hub, and more than two disks are mounted on it. Furthermore, the technical concept of the invention can be effectively applied to both a disk driving device in which its disk driving motor is of the fixed shaft type, and a disk driving device in which its disk driving motor is of the rotary shaft type. Furthermore, in the device of the invention, the disk mounted therein is held excellent in straightness. In addition, the straightness of the disk is maintained at a high level in all types of disk driving devices. Thus, the invention is more effectively applied to a disk driving device of disk exchanging type.

Effects of the Invention

In the disk driving device of the invention, the disk mounting surface formed on the hub, which rotates together with the disk mounted on it, is inclined radially outwardly of the axis of rotation of the hub towards the side of the latter where the disk is mounted. Therefore, in the device, the disk mounted on the disk mounting surface is high in straightness. Hence, the device of the invention is free from the difficulty that the head cannot satisfactorily read data from the disk.

While the foregoing description and drawings represent the preferred embodiments of the present invention, it will be obvious to those skilled in the art that various changes and modifications may be made therein without departing from the true spirit and scope of the prescott invention.

What is claimed is:

1. A rigid disk driving device comprising:
   a hub on which a rigid data recording disk is mounted, said hub being rotated together with said disk;
   said hub having a disk mounting surface on which said disk is mounted so as to be in surface-to-surface contact with the mounting surface;
   said disk mounting surface having an inner rim portion and an outer rim portion;
   said disk mounting surface being inclined upwardly and radially outwardly from the axis of rotation of said hub towards the side of said hub where said disk is mounted so as to define an acute angle with said axis of rotation so that the outer rim portion is higher than the inner rim portion.

2. A rigid disk driving device comprising:
   a cylindrical hub;
   an electric motor including a rotor and a stator, said electric motor being accommodated in a cylindrical portion of said hub; and
   a rigid data recording disk, said hub having a disk mounting surface on which said disk is mounted so as to be in surface-to-surface contact with the mounting surface;
   said disk mounting surface having an inner rim portion and an outer rim portion;
   said disk mounting surface of said hub being inclined upwardly and radially outwardly from the axis of rotation of said hub towards the side of said hub where said disk is mounted so as to define an acute angle with said axis of rotation so that the outer rim portion is higher than the inner rim portion.

3. A disk driving device as claimed in claim 1 in which said disk mounted on said hub is fixedly secured with a plate-shaped retaining member.

4. A disk driving device as claimed in claim 2 in which said disk mounted in said hub is fixedly secured with a plate-shaped retaining member.

5. A disk driving device as claimed in claim 3, in which said plate-shaped retaining member is fixedly secured by using threaded holes formed in said hub.

6. A disk driving device as claimed in claim 4 in which said plate-shaped retaining member is fixedly secured by using threaded holes formed in said hub.

7. A disk driving device as claimed in claim 3, in which said plate-shaped retaining member is substantially equal in size to said disk mounting surface formed on said hub.

8. A disk driving device as claimed in claim 4 in which said plate-shaped retaining member is substantially equal in size to said disk mounting surface formed on said hub.

* * * * *